United States Patent
Rumpler

(10) Patent No.: US 6,577,470 B1
(45) Date of Patent: Jun. 10, 2003

(54) METHOD AND SYSTEM FOR PROVIDING A TAPE HEAD SUBASSEMBLY STRUCTURE HAVING AN INTEGRATED WEAR BAR AND OUTRIGGER RAIL

(75) Inventor: Allen G. Rumpler, Pleasanton, CA (US)

(73) Assignee: Read-Rite Corporation, Fremont, CA (US)

( * ) Notice: Subject to any disclaimer, the term of this patent is extended or adjusted under 35 U.S.C. 154(b) by 166 days.

(21) Appl. No.: 09/770,941

(22) Filed: Jan. 25, 2001

(51) Int. Cl.[7] .............................................. G11B 5/187
(52) U.S. Cl. ..................................................... 360/122
(58) Field of Search ........................ 360/122, 119–120, 360/125

(56) References Cited

U.S. PATENT DOCUMENTS 5,237,476 A * 8/1993 Bischoff et al. ............ 360/121
5,276,578 A * 1/1994 Kato et al. .................. 360/121

* cited by examiner

Primary Examiner—George J. Letscher
(74) Attorney, Agent, or Firm—Sawyer Law Group LLP

(57) ABSTRACT

A method and system for providing a tape head subassembly is disclosed. The method and system include providing a device, a left head block segment and a right head block segment. The device is for writing to a media. The left head block segment includes an integrated outrigger rail and has a first space. The right head block segment includes a first wear bar and a second wear bar and has a second space therein. The first and second wear bars are integrated as part of the right head block segment. The second space separating the first wear bar from the second wear bar and is configured to fit the device. The tape head subassembly is formed by bonding the device, the right head block segment and the left head block segment such that the device fits into the first space and the second space.

10 Claims, 4 Drawing Sheets

METHOD AND SYSTEM FOR PROVIDING A TAPE HEAD SUBASSEMBLY STRUCTURE HAVING AN INTEGRATED WEAR BAR AND OUTRIGGER RAIL

FIELD OF THE INVENTION

The present invention relates to magnetic recording technology, and more particularly to a method and system for providing a tape head subassembly that is more stable and easier to assemble.

BACKGROUND OF THE INVENTION

Tape subassemblies are used in tape drives for writing to and reading from tape media. FIG. 1 depicts a conventional tape head subassembly 10 in which the individual components have been separated. The conventional tape head subassembly 10 is used in writing to or reading from a tape in a conventional tape drive. The conventional tape head subassembly 10 includes the device 12, conventional wear bars 14A and 14B, conventional tie bar 16 and conventional body 18. The conventional tape head subassembly thus includes five different parts. The device 12 is actually used for writing to and reading from the media (not shown). Thus, the device 12 typically includes an active rail (not explicitly shown) is which includes poles for writing to the media. A cable (not shown) including is typically coupled with the device 12 for providing electrical signals to and receiving electrical signals from the device 12. The conventional wear bars 14A and 14B, the conventional tie bar 16 are composed of an AlTiC (aluminum titanium carbide) material. The conventional body 18 is ceramic. The conventional body 18 is used as a base for the conventional tape head subassembly 10. The conventional wear bars 14A and 14B are used to protect the device 12 from wear due to contact with the tape (not shown) with which the conventional tape head subassembly 10 is used. The conventional tie bar 16 is used to stabilize the conventional tape head subassembly 10. Although some conventional subassemblies (not shown) are fabricated without a conventional tie bar 16, such conventional subassemblies may have significant problems due to micromovements of components of the subassemblies. In addition, the conventional tie bar 16 acts as an outrigger rail. Thus, the tape (not shown) runs over the conventional tie bar 16 (acting as an outrigger rail) and over the active rail. Thus, the conventional tie bar 16, when acting as an outrigger rail, aids in stabilizing the conventional tape head subassembly 10.

Although the conventional tape head subassembly 10 functions, one of ordinary skill in the art will readily realize that it has drawbacks. In order to complete the conventional tape head subassembly 10, the device 12, the conventional wear bars 14A and 14B, the conventional tie bar 16 and the conventional body 18 are epoxy bonded together. Thus, assembly of the conventional tape head subassembly 10 is time consuming and relatively difficult because it requires that five components be precisely put together. In addition, because there is a relatively large number of components being bonded together, the components 12, 14A, 14B, 16 and 18 are more likely to move with respect to each other. As a result, performance and reliability of the conventional tape head subassembly is adversely affected.

Accordingly, what is needed is a system and method for providing a tape head subassembly that is simpler to assemble and less subject to micromovements. The present invention addresses such a need.

SUMMARY OF THE INVENTION

The present invention provides a method and system for providing a tape head subassembly. The method and system comprise providing a device, a left head block segment and a right head block segment. The device is for writing to a media. The left head block segment includes an integrated outrigger rail and has a first space. The right head block segment includes a first wear bar and a second wear bar and has a second space therein. The first and second wear bars are integrated as part of the right head block segment. The second space separating the first wear bar from the second wear bar and is configured to fit the device. The tape head subassembly is formed by bonding the device, as the right head block segment and the left head block segment such that the device fits into the first space and the second space.

According to the system and method disclosed herein, the present invention provides a tape head subassembly which is structurally more stable and that is simpler to assemble.

DETAILED DESCRIPTION OF THE INVENTION

The present invention relates to an improvement in magnetic recording technology. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Conventional tape subassemblies hold the device that includes the write and read head for a tape drive. In addition to the device, conventional tape subassemblies typically include a pair of wear bars, a body and, in some cases, a tie bar primarily used for mechanical stability. Although such conventional tape subassemblies function, one of ordinary skill in the art will readily realize that such conventional tape subassemblies are difficult to assemble because a relatively large number of parts must be aligned precisely and bonded together. In addition, because of the large number of components in the conventional subassembly, the components typically move with respect to each other. Such micromovements adversely affect the reliability and performance of the conventional tape head subassembly.

The present invention will be described in terms of tape subassemblies having components shaped in a particular fashion and having certain functions. However, one of ordinary skill in the art will readily recognize that this method and system will operate effectively for other components having different shapes and other functions.

Figure 1:
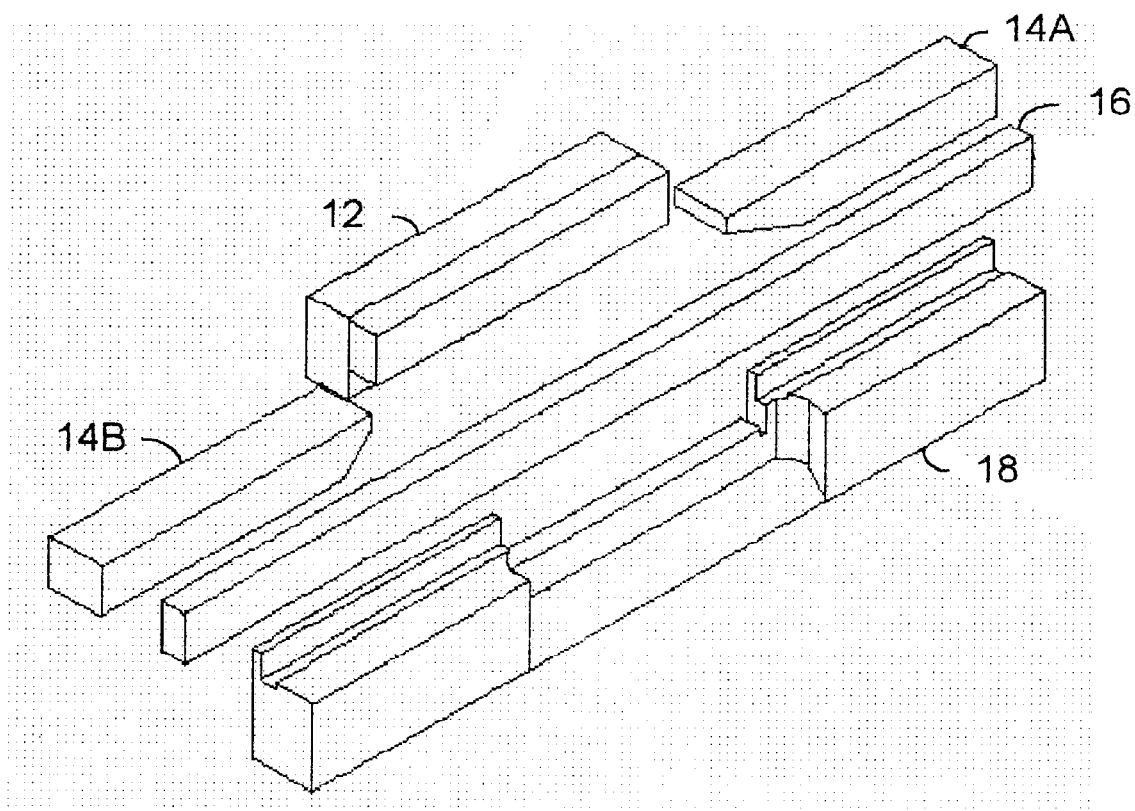
FIG. 1 is a diagram of a conventional tape head subassembly.
Figure 2A:
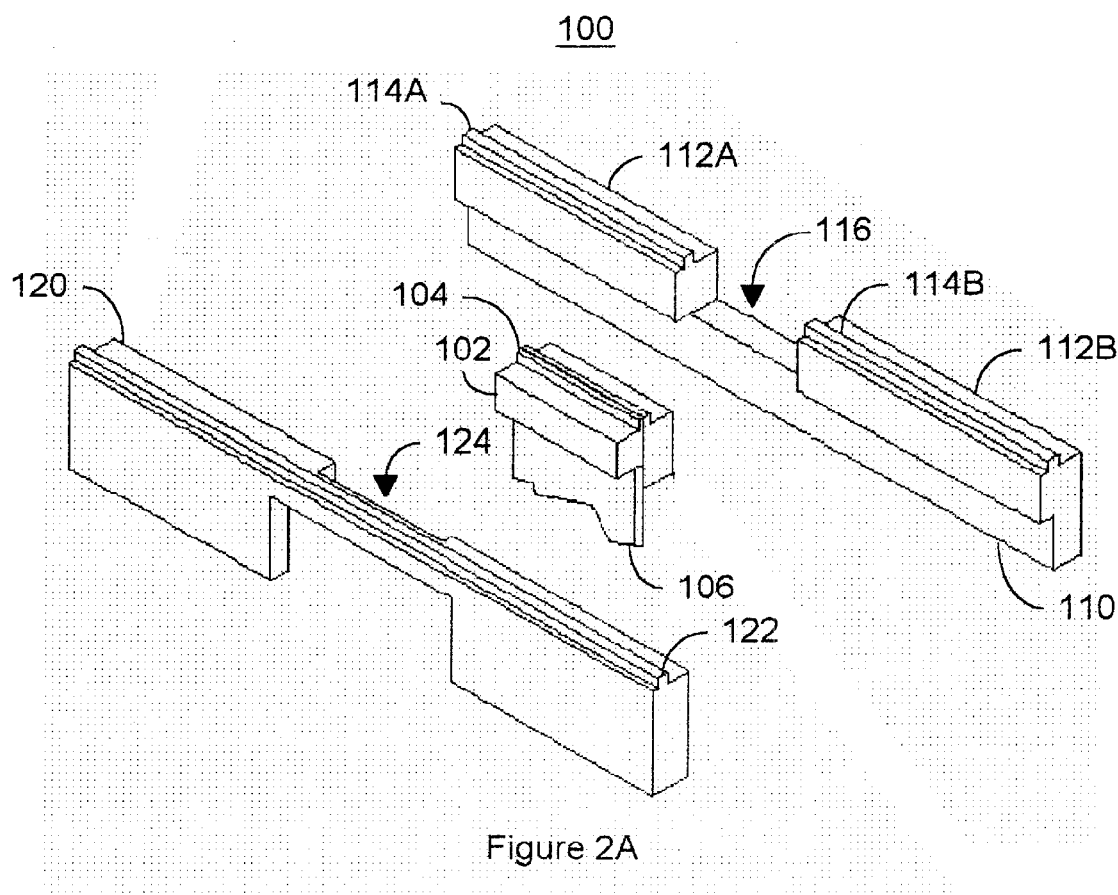
FIG. 2A is a diagram of one embodiment of a portion of a tape head subassembly in accordance with the present invention.
Figure 2B:
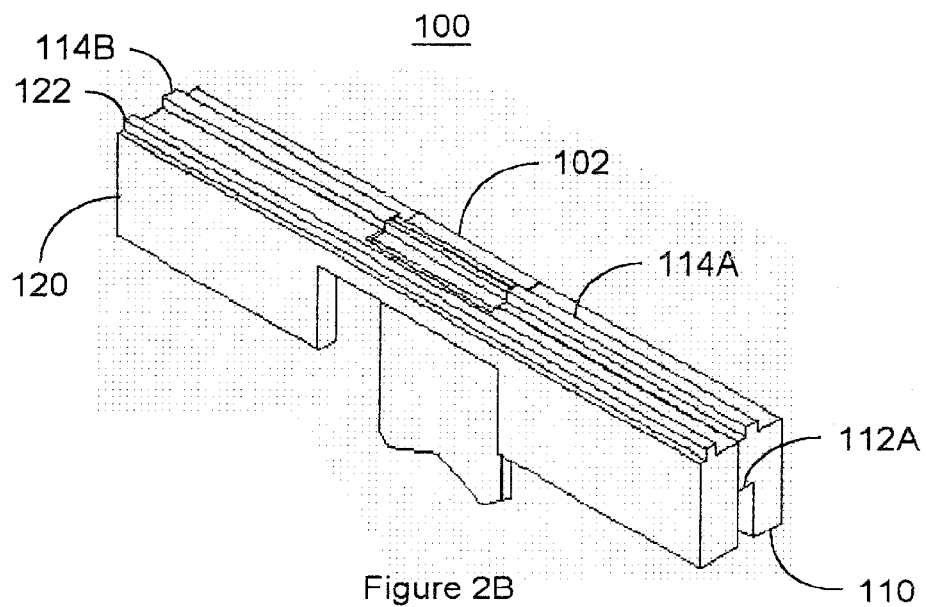
FIG. 2B is a diagram of one embodiment of another portion of a tape head subassembly in accordance with the present invention.

To more particularly illustrate the method and system in accordance with the present invention, refer now to FIGS. 2A and 2B, depicting one embodiment of a tape head subassembly 100 in accordance with the present invention. FIG. 2A depicts the tape head subassembly 100 with its components separated, while FIG. 2B depicts the tape head subassembly 100 as assembled. In a preferred embodiment, the tape head subassembly 100 is one of two subassembly used in a magnetic recording device. The tape head subassembly 100 includes a device 102, a right head block segment 110 and a left head block segment 120. Thus, the tape head subassembly 100 includes only three parts. The device 102 is used to write to a tape media. Thus, the device 102 includes a portion of an active rail 104. Also shown is a portion of the cable 106 which is attached to the device 102 and provides an electrical connection to the device 102.

The right head block segment 110 includes integrated wear bars 112A and 112B that are separated by gap 116. The wear bars 112A and 112B includes portions 114A and 114B of an active rail. The wear bars 112A and 112B and the portions 114A and 114B of the active rail are all part of a single piece. Thus, the wear bars 112A and 112B and the portions 114A and 114B of the active rail are all integrated into the right head block segment 110. The left head block segment 120 includes an outrigger rail 122 and a space 124. The outrigger rail 122 is integrated into the left head block segment 120. Thus, the left head block segment 120 is a single piece. During use, the tape media (not shown) runs over the outrigger rail 122, then to the active rail.

In order to assembly the tape head subassembly 100, the left head block assembly 120, the right head block assembly 110 and the device 102 are attached, preferably by epoxy bonding. The device 102 fits into the gap 116 between the wear bars 112A and 112B such that the portion 104 of the active rail on the device 102 combines with the portions 114A and 114B of the active rail on the wear bars 112A and 112B, respectively, to form an active rail. The device 102 also fits into the space 124 of the left head block segment 120. Thus, as shown in FIG. 2B, the components 102, 110 and 120 fit together to form a tape head subassembly having an active rail (including portions 104, 114A and 114B), wear bars 112A and 112B and an outrigger rail 122.

Thus, the tape head subassembly 100 has the benefits of its components, such as the reduced wear due to the wear bars 112A and 112B and increased stability with respect to the tape because of the outrigger rail 122. In addition, the tape head subassembly 100 is simpler to assemble. Although the left head block segment 120 and the right head block segment 110 may be more complex to fabricate as a single piece, this added complexity is more than offset by the ease with which the left head block segment 120, the right head block segment 110 and the device 102 can be assembled. In order to assemble the tape head subassembly 100, the right head block segment 110, the left head block segment 120 and the device 102 are attached, preferably by epoxy bonding the right head block segment 110, the left head block segment 120 and the device 102. Moreover, because there are fewer parts which are bonded together, there is less motion in the tape head subassembly 100 due to motion between the right head block segment 110, the left head block segment 120 and the device 102. Thus, faults in the tape head subassembly 100 due to micromovements are reduced.

Figure 3A:
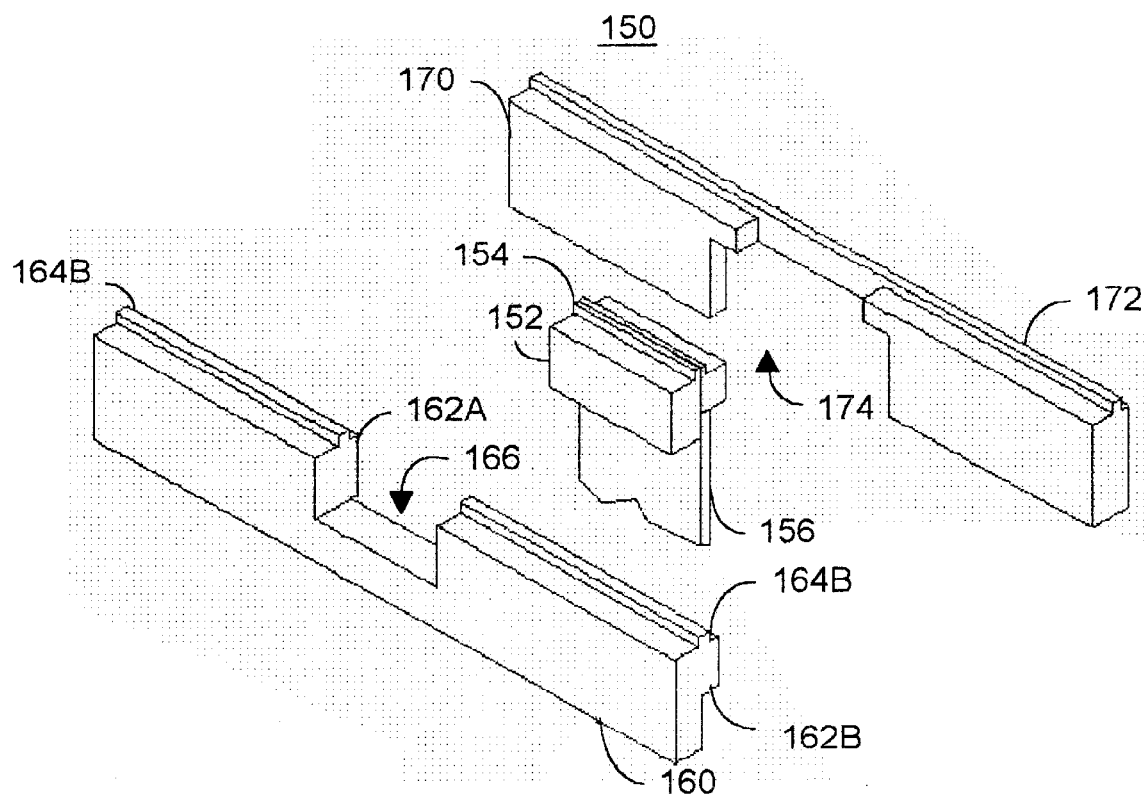
FIG. 3A is a diagram of one embodiment of another portion of a tape head subassembly in accordance with the present invention.
Figure 3B:
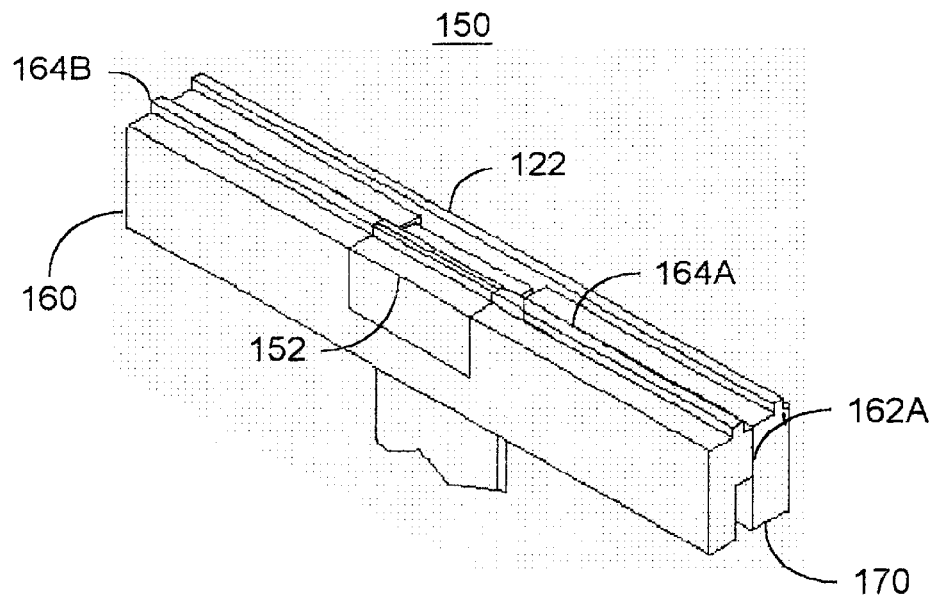
FIG. 3B is a diagram of one embodiment of another portion of a tape head subassembly in accordance with the present invention.

FIGS. 3A and 3B depict another embodiment of a tape head subassembly 150 in accordance with the present invention. FIG. 3A depicts the tape head subassembly 150 with its components separated, while FIG. 3B depicts the tape head subassembly 150 as assembled. In a preferred embodiment, the tape head subassembly 150 is one of two subassembly used in a magnetic recording device. Thus, in a preferred embodiment, described below, the tape head subassembly 100 and 150 are utilized together. The tape head subassembly 150 includes a device 152, a right head block segment 170 and a left head block segment 160. The right head block segment 170 is analogous to the left head block segment 120 depicted in FIGS. 2A and 2B. Similarly, the left head block segment 160 of FIGS. 3A and 3B is analogous to the right head block segment 110 depicted in FIGS. 2A and 2B. For example, the left head block segment 160 includes portions 164A and 164B of the active rail. In particular, the right head block segment 170 and left head block segment 160 of FIGS. 3A and 3B are mirror images of the left head block segment 120 and the right head block segment 220, respectively, of FIGS. 2A and 2B.

The tape head subassembly 150 thus has many of the same benefits of the tape head subassembly 100. The tape head subassembly 150 has the benefits of its components, such as the reduced wear due to the wear bars 162A and 162B and increased stability with respect to the tape because of the outrigger rail 172. In addition, the tape head subassembly 150 is simpler to assemble. Although the left head block segment 170 and the right head block segment 160 may be more complex to fabricate as a single piece, this added complexity is more than offset by the ease with which the left head block segment 160, the right head block segment 170 and the device 152 can be assembled. In order to assemble the tape head subassembly 150, the right head block segment 170, the left head block segment 160 and the device 152 are attached, preferably by epoxy bonding the right head block segment 170, the left head block segment 160 and the device 152. Moreover, because there are fewer parts which are bonded together, there is less motion in the tape head subassembly 150 due to motion between the right head block segment 170, the left head block segment 160 and the device 152. Thus, faults in the tape head subassembly 150 due to micromovements are reduced.

Figure 4A:
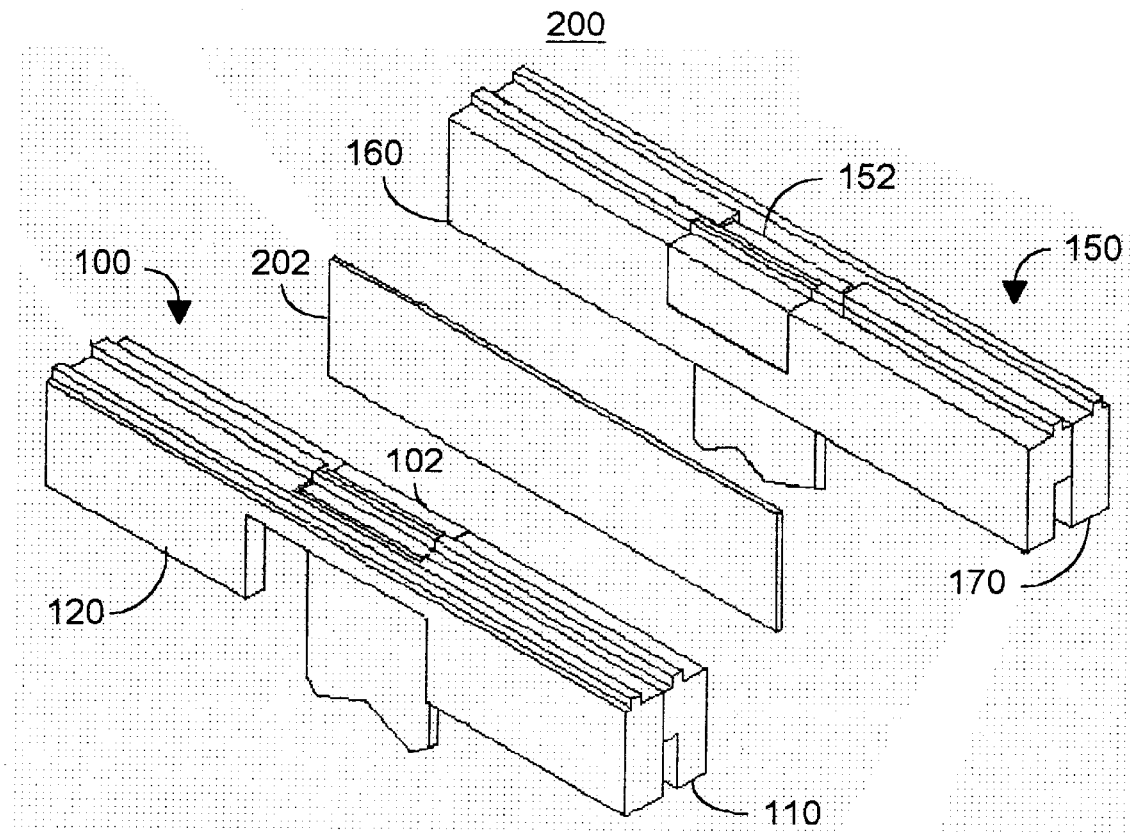
FIG. 4A is a diagram of one embodiment of a tape head subassembly in accordance with the present invention.
Figure 4B:
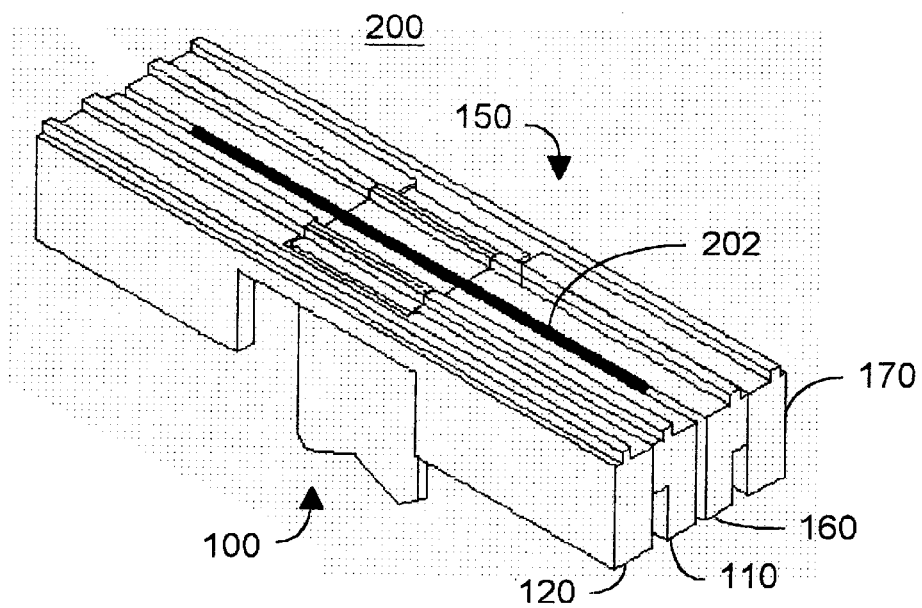
FIG. 4B is a diagram of one embodiment of a tape head subassembly in accordance with the present invention.

FIGS. 4A and 4B depict a preferred embodiment of a tape head subassembly 200 in accordance with the present invention. FIG. 4A depicts the tape head subassembly 200 with the major components separated. FIG. 4B depicts the tape head subassembly 200 as assembled. The tape head subassembly 200 includes the tape head subassembly 100 and the tape head subassembly 150, termed the left tape head subassembly 100 and the right tape head subassembly 150 in FIGS. 4A and 4B. Thus, the tape head subassembly 200 includes a first tape head subassembly 100 and a second tape head subassembly 150, each having a device 102 and 152, respectively. The tape head subassembly 200 thus includes a first right head block segment 110, a first left head block segment 120, a second right head block segment 170 and a second left head block assembly 160 and a shield 202. The head block segments 110, 120, 160 and 170 have the properties described above with respect to FIGS. 2A, 2B, 3A and 3B. Referring back to FIGS. 4A and 4B, the head block segments 110, 120, 160 and 170 are each formed from a single piece of material, preferably aluminum-titanium-carbide. Thus, the constituents of each of the head block segments 110, 120, 160 and 170, such as the wear bars (not explicitly numbered in FIGS. 4A and 4B), are integrated into the corresponding head block segments 110, 130, 160 and 170, respectively. The shield 202 is used to magnetically isolate the first tape head subassembly 100 from the second tape head subassembly 150.

The subassembly 200 thus can use two devices 102 and 152 for recording, making recording more efficient. In addition, because each of the subassemblies 100 and 150 has only three parts, the subassembly 200 may have the benefits of the subassemblies 100 and 150. In particular, the subassembly 200 may be simpler to assemble because fewer parts are bonded for each of the subassemblies 100 and 150. In addition, each subassembly 100 and 150 has reduced motion of its components. Thus, the subassembly 200 is less subject to failures due to micromotion of its constituents. As a result, performance and reliability of the subassembly 200 is improved.

A method and system has been disclosed for providing a tape head subassembly which is simpler to assemble and is less subject to micromovements. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A tape head subassembly comprising:
   a device for writing to a media;
   a left head block segment including an integrated outrigger rail, the left head block segment having a first space; and
   a right head block segment including a first wear bar and a second wear bar, the first wear bar and the second wear bar integrated as part of the right head block segment, the right head block segment having a second space therein, the second space separating the first wear bar from the second wear bar and being configured to fit the device;
   wherein the tape head subassembly is formed by bonding the device, the right head block segment and the left head block segment such that the device fits into the first space and the second space;
   wherein the integrated outrigger rail and the left head block segment are formed as a first single piece, the integrated outrigger rail being integrated into a left head block segment; and
   wherein the first wear bar and the second wear bar and the right head block segment are formed as a second single piece, the first wear bar and the second wear bar being integrated into the right head block segment.

2. The tape head subassembly of claim 1 wherein the right head block segment further includes an active rail integrated into the first wear bar and the second wear bar.

3. The tape head subassembly of claim 1 further comprising:
   a cable coupled to the device for providing electrical signals to and from the device.

4. A tape head subassembly comprising:
   a first device for writing to a media;
   assembly and by bonding the shield between the first assembly and the second assembly.

5. A tape head subassembly comprising:
   a device for writing to a media;
   a left head block means including an integrated outrigger rail, the left head block means having a first space;
   a right head block means including a first wear bar and a second wear bar, the first wear bar and the second wear bar integrated as part of the right head block means, the right head block segment having a second space therein, the second space separating the first wear bar from the second wear bar and being configured to fit the device;
   wherein the tape head subassembly is formed by bonding the device, the right head block means and the left head block means such that the device fits into the first space and the second space;
   wherein the integrated outrigger rail and the left head block means are formed as a first single piece, the integrated outrigger rail being integrated into the left head block means; and
   wherein the first wear bar and the second wear bar and the right head block means are formed as a second single piece, the first wear bar and the second wear bar being integrated into the right head block means.

6. A method for providing a tape head subassembly comprising the steps of:
   (a) providing a device for writing to a media;
   (b) providing a left head block segment including an integrated outrigger rail, the left head block segment having a first space;
      wherein the left head block segment providing step (b) further includes the step of:
         (b1) forming the integrated outrigger rail and the left head block as a first single piece, the integrated outrigger rail being integrated into the left head block segment;
   (c) providing a right head block segment including a first wear bar and a second wear bar, the first wear bar and the second wear bar integrated as part of the right head block segment, the right head block segment having a second space therein, the second space separating the first wear bar from the second wear bar and being configured to fit the device;
      wherein the right head block segment providing step (c) further includes the step of:
         (c1) forming the first wear bar and the second wear bar and the right head block segment as a second single piece, the first wear bar and the second wear bar being integrated into the right head block segment; and
   (d) assembling the tape head subassembly by bonding the device, the right head block segment and the left head block segment such that the device fits into the first space and the second space.

7. The method of claim 6 wherein the step of providing the right head block segment (c) further includes the step of:
   (c1) providing an active rail integrated into the first wear bar and the second wear bar.

8. The method of claim 6 further comprising the step of:
   (e) providing a cable coupled to the device for providing electrical signals to and from the device.

9. A method for providing tape head subassembly comprising the steps of:

(a) providing a first device for writing to a media;

(b) providing a first left head block segment including an integrated outrigger rail, the first left head block segment having a first space, the first left head block segment being a single piece;

(c) providing a first right head block segment including a first wear bar and a second wear bar, the first wear bar and the second wear bar integrated as part of the first right head block segment, the first right head block segment having a second space therein, the second space separating the first wear bar from the second wear bar and being configured to fit the first device, the first right head block segment being a single piece;

(d) providing a second device for writing to a media;

(e) providing a second right head block segment including a second integrated outrigger rail, the second right head block segment having a third space, the second right head block segment being a single piece;

(f) providing a second left head block segment including a third wear bar and a fourth wear bar, the third wear bar and the fourth wear bar integrated as part of the second left head block segment, the second left head block segment having a fourth space therein, the fourth space separating the third wear bar from the fourth wear bar and being configured to fit the second device, the second left head block segment being a single piece; and (g) providing a shield;

wherein the tape head subassembly is formed by bonding the first device, the first right head block segment and the first left head block segment such that the first device fits into the first space and the second space to form a first assembly, by bonding the second device, the second right head block segment and the second left head block segment such that the second device fits into the third space and the fourth space to form a second assembly and by bonding the shield between the first assembly and the second assembly.

10. A tape head subassembly comprising:

a device for writing to a media;

a first head block segment including an integrated outrigger rail, the first head block segment having a first space, the first head block segment and the integrated outrigger rail being formed as a first single piece, the integrated outrigger rail being integrated into the first head block segment; and a second head block segment including a first wear bar and a second wear bar, the first wear bar and the second wear bar integrated as part of the second head block segment, the second head block segment having a second space therein, the second space separating the first wear bar from the second wear bar and being configured to fit the device, the second head block segment, the first wear bar and the second wear bar being formed as a second single piece, the first wear bar and the second wear bar being integrated into the second head block segment;

wherein the tape head subassembly is formed by bonding the device, the second head block segment and the first head block segment such that the device fits into the first space and the second space.

* * * * *